W. H. AND C. B. NOELTING.
LEG MOUNT CASTER.
APPLICATION FILED AUG. 29, 1921.
1,414,150.
Patented Apr. 25, 1922.
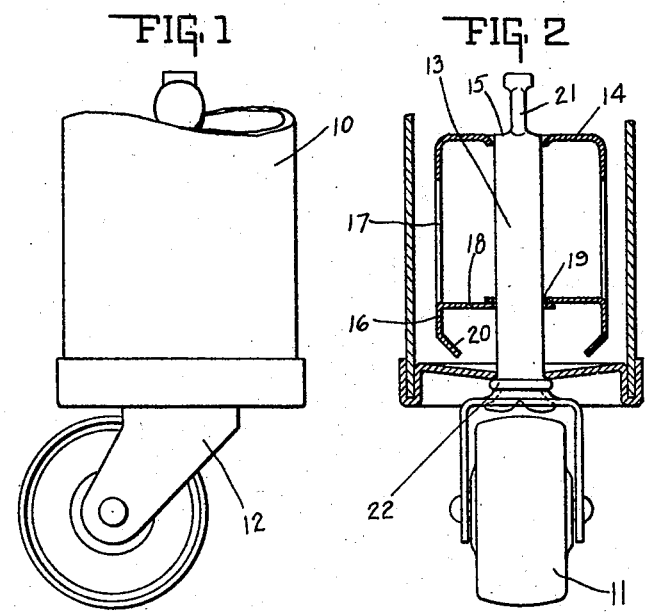
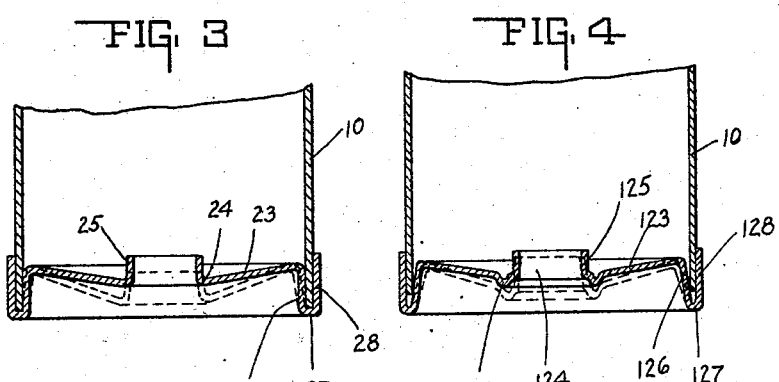
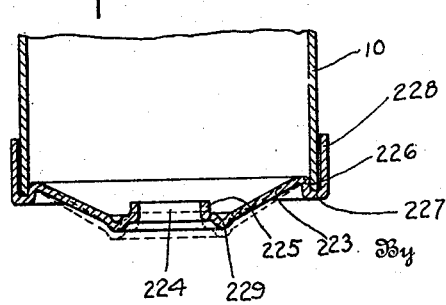
Inventors
WILLIAM H. NOELTING.
CLARENCE B. NOELTING.
Attorneys

UNITED STATES PATENT OFFICE.

WILLIAM H. NOELTING AND CLARENCE B. NOELTING, OF EVANSVILLE, INDIANA, ASSIGNORS TO FAULTLESS CASTER COMPANY, OF EVANSVILLE, INDIANA, A CORPORATION.

LEG-MOUNT CASTER.

1,414,150.      Specification of Letters Patent.      Patented Apr. 25, 1922.

Application filed August 29, 1921. Serial No. 496,430.

*To all whom it may concern:*

Be it known that we, WILLIAM H. NOELTING and CLARENCE B. NOELTING, citizens of the United States, and residents of Evansville, county of Vanderburg, and State of Indiana, have invented a certain new and useful Leg-Mount Caster; and we do hereby declare that the following is a full, clear, and exact description thereof, reference being had to the accompanying drawings, in which like numerals refer to like parts.

This invention relates to a leg mount caster, and the chief object thereof is to provide an improved leg mount for a tubular leg.

The chief feature of the invention consists in the particular construction of the leg mount.

The full nature of the invention will be understood from the accompanying drawings and the following description and claims.

In the drawings, Fig. 1 is a side elevational view of the supported end of a tubular leg showing a caster and the improved leg mount associated therewith. Fig. 2 is a central sectional view through the same. Fig. 3 is an enlarged central sectional view of the tubular leg, and improved leg mount, showing the same in associated relation by full lines and in un-associated relation by the dotted lines. Fig. 4 is a view similar to Fig. 3 and of a modified form of the invention. Fig. 5 is a view similar to Fig. 3 of another modified form of the invention.

In the drawings, 10 indicates a tubular leg which is of relatively thin cross sectional area with respect to the diameter of the circular leg. Herein the leg is illustrated as substantially circular, although other forms of tubular legs may be used without departing from the invention.

The caster construction associated with the leg includes the wheel 11, the yoke 12 and the pintle 13. The caster is retained within the tubular leg and the upper end thereof is centered within said leg by a spring member with yielding retaining arms, comprising the spring clip member 14 which is centrally apertured at 15 to receive the upper end of the pintle and two parallel and downwardly extending arms 16 which are apertured at 17 to provide two inwardly extending intermediate projections 18 which are also apertured such that when said inwardly extending arm portions 18 are positioned adjacent each other, the apertures 19 thereof register. Preferably the apertures 19 are elongated so that the spring arms 16 may spring outwardly to a limited degree, being restrained by the inwardly extending arms 18 through the pintle 13 which extends through the registering elongated apertures 19. Herein the spring arms 16 terminate in inwardly extending ends 20. The head of the pintle 13 is suitably enlarged or upset as indicated at 21 to retain the spring centering and yielding retaining member 14 or any other suitable means upon said pintle.

The pintle adjacent the yoke portion is provided with an annular enlargement, such as the ring portion 22, and seatable upon said ring portion is a leg mount construction which includes a downwardly dished disk or plate portion 23 which is centrally apertured at 24 to provide an opening for the pintle to extend therethrough. There is also provided around the opening and extending upwardly from the dished-shape plate of the disk a bearing flange 25 which aids in centering the pintle. Also since the upper end of the pintle is centered, the relatively elongated tubular bearing portion 25 serves to prevent excessive angular movement and excessive wear of the plate upon the pintle. The outer end of the plate terminates in an inner flange 26, which is substantially annular since the tube with which it is to be associated is annular, and said flange terminates in a supporting portion 27 which is turned upwardly at 28 to form an outside flange concentric with the inside flange 26 and between which there is formed a groove adapted to loosely receive the end of the tubular leg 10. The dotted lines in Fig. 3 indicate the normal position of the portions of the leg mount construction before positioning the same upon the tubular leg; while after the same is positioned upon the tubular leg and the weight is supported by said caster, the portions assuming the full line positions. This change in positioning, therefore, forces the inside flange 26 outwardly into engagement with the inner wall of the tubular leg to frictionally engage the same and thereby frictionally retain, as well as center said leg mount upon the tubular leg. The outside flange 28 may be so positioned as to bear against the tubular leg 10 or may be relatively free therefrom, as desired, since frictional engagement of the outside flange is not necessary in this form of construction.

In Fig. 4 there is shown a modified form of the invention and the leg mount is herein illustrated as including the outside flange 128 and the inside flange 126, a supporting portion 127, the dished-shape plate portion 123 and the bearing portion 125 with the central opening 124. In this modification, however, instead of the annular channel being sufficiently large so as to freely receive the tube 10, said annular channel is substantially V-shaped and a double pinch is secured. This double pinch is caused by the application of a load through the tubular leg, which serves to force said leg into the V-shaped groove and towards the base thereof, which forces the outside annular flange outwardly so that the same bears against the exterior of the tubular leg and simultaneously with the application of the load, the bearing portion 125, together with the dished portion, moves upwardly within the tubular leg, thereby forcing the upper portion of the inner flange 126 outwardly into engagement with the inner surface of the tubular leg. This, therefore, secures a clamping action or double pinch. Herein the inner and outer flanges are illustrated as substantially continuous, but this is not essential so long as the results hereinbefore described are secured by the inner flange and in the second case illustrated in Fig. 4 by both flanges.

Between the bearing 125 and its connection with the dished-shape plate portion 123, there is provided an annular depending flange forming portion, which by being concentric with the bearing 125 but of slightly larger diameter, forms a seat adapted to receive and center the ring flange 22 on the caster pintle.

Fig. 5 illustrates a modified form of the invention and in this form of the invention, it will be noted that the outer annular flange 228, which is purely ornamental in this instance, is spaced a considerable distance away from the tube 10. In this modification, which is substantially similar to that shown in Figs. 3 and 4, it will be noted that the bearing 225 provides the pintle opening 224 and the depending annular flange 229 forms the centering flange for the pintle ring 22. The dished-shape plate portion 223, as in all the modifications, is provided with a depending flange portion 226 for engaging and frictionally gripping the inner surface of the tubular part 10, which is supported when weight is applied thereto by the supporting portion 227. It will be noted that in Figs. 2 and 3, the ornamental flange 28 is positioned close to the tubular part 10, and may or may not, as desired, frictionally engage said tubular part. In Fig. 5 the flange 228 is shown in spaced relation with said tubular member; while in Fig. 4, the outside flange 128 frictionally engages the tubular part 10 to cooperate with the inner flange 126.

The invention claimed is:

1. A caster for tubular legs including a leg supporting plate having a central opening to receive a caster pintle and be supported thereby, and substantially continuous flange means engaging substantially the entire interior periphery of the tubular leg.

2. A caster for tubular legs including a leg supporting plate having a central opening to receive a caster pintle and be supported thereby, substantially continuous flange means engaging substantially the entire interior periphery of the tubular leg, and an outer flange in spaced relation with the inner flange for forming a leg receiving groove.

3. A caster for tubular legs including a downwardly dished-shape leg supporting plate having a central opening to receive a caster pintle and be supported thereby, substantially continuous flange means engaging substantially the entire interior periphery of the tubular leg, and an upwardly extending bearing surrounding said opening.

4. In a leg mount for tubular legs including a leg supporting portion, an upturned flange for enclosing the end of the tubular leg, and a second upturned flange within said tubular leg for centering said leg mount and engaging the interior of said tubular leg for securing the same thereto.

5. A leg mount for tubular legs including a leg supporting disk having a U-shaped groove adapted to receive the tubular leg and for centering the pintle within said leg and securing said leg mount to said leg.

6. A caster for tubular legs, including a dished-shape leg supporting plate having a central opening to receive a caster pintle, substantially continuous upwardly extending flange means surrounding said opening and forming a tubular bearing for the pintle, an intermediate downwardly extending flange means between said tubular bearing flange and the dished-shape plate and concentric with the tubular flange for centering and limiting the inward movement of the caster pintle, and substantially continuous flange means engaging substantially the entire interior periphery of the tubular leg.

7. A caster for tubular legs, including a dished-shape leg supporting plate having a central opening to receive a caster pintle, substantially continuous upwardly extending flange means surrounding said opening and forming a tubular bearing for the pintle, an intermediate downwardly extending flange means between said tubular bearing flange and the dished-shape plate and concentric with the tubular flange for centering and limiting the inward movement of the caster pintle, substantially continuous flange means engaging substantially the entire interior periphery of the tubular leg, and an upwardly extending outer flange concentric with the inner bearing flange for enclosing the lower end of the tubular leg.

In witness whereof, we have hereunto affixed our signatures.

WILLIAM H. NOELTING.
CLARENCE B. NOELTING.